United States Patent
Li et al.

(10) Patent No.: US 11,144,467 B2
(45) Date of Patent: Oct. 12, 2021

(54) BYPASSING CACHE MEMORY IN A WRITE TRANSACTION IN A SYSTEM WITH MULTI-LEVEL MEMORY

(71) Applicant: Intel Corporation, Santa Clara, CA (US)

(72) Inventors: Yanru Li, San Diego, CA (US); Ali Taha, San Diego, CA (US); Chia-Hung S. Kuo, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 102 days.

(21) Appl. No.: 16/416,036

(22) Filed: May 17, 2019

(65) Prior Publication Data

US 2019/0272236 A1    Sep. 5, 2019

(51) Int. Cl.
   *G06F 12/00*     (2006.01)
   *G06F 12/0888*   (2016.01)
   *G06F 12/0891*   (2016.01)

(52) U.S. Cl.
   CPC ...... *G06F 12/0888* (2013.01); *G06F 12/0891* (2013.01); *G06F 2212/1024* (2013.01); *G06F 2212/608* (2013.01)

(58) Field of Classification Search
   None
   See application file for complete search history.

(56) References Cited

U.S. PATENT DOCUMENTS

| | | | | |
|---|---|---|---|---|
| 5,799,210 A | * | 8/1998 | Cohen | G06F 7/22 710/56 |
| 6,446,145 B1 | * | 9/2002 | Har | G06F 12/08 710/68 |
| 6,901,500 B1 | * | 5/2005 | Hussain | G06F 9/3824 710/52 |
| 8,612,676 B2 | | 12/2013 | Dahlen et al. | |
| 2008/0082734 A1 | * | 4/2008 | Karamcheti | G06F 13/1657 711/103 |

(Continued)

OTHER PUBLICATIONS

Jay Willem Aldershoff, "Intel reveals App Direct mode and Memory mode for Optane DC Persistent Memory," Nov. 1, 2018, retrieved Aug. 19, 2019: https://www.myce.com/news/intel-reveals-app-direct-mode-and-memory-mode-for-optane-dc-persistent-memory-85373/.

(Continued)

*Primary Examiner* — Craig S Goldschmidt
(74) *Attorney, Agent, or Firm* — Schwabe, Williamson & Wyatt, P.C.

(57) ABSTRACT

Embodiments of the present disclosure relate to an apparatus, comprising a first memory controller, to receive a signal from a component coupled with the first memory controller, where the signal indicates that data is to bypass a volatile memory device coupled with the first memory controller and be written to a byte-addressable write-in-place persistent memory device coupled with the first memory controller; determine, in response to the received signal, whether a write buffer in a second memory controller, coupled with the first memory controller, is empty; direct, if the write buffer is empty, the data to the write buffer for temporary storage prior to storage in the persistent memory device, to bypass the volatile memory device; and direct, if the write buffer is not empty, the data to the volatile memory device.

17 Claims, 5 Drawing Sheets

(56) References Cited

U.S. PATENT DOCUMENTS

2015/0082062 A1* 3/2015 Saraswat .................. G11C 5/14
713/323
2018/0300258 A1* 10/2018 Wokhlu .............. G06F 12/0862
2019/0042445 A1 2/2019 Swaminathan et al.
2019/0096489 A1 3/2019 Mosiolek et al.
2019/0138448 A1 5/2019 Li et al.
2019/0171573 A1* 6/2019 Rose ................... G06F 12/0837

OTHER PUBLICATIONS

ARM® DynamIQ™ Shared Unit Technical Reference Manual, Revision r0p2, (2016/2017), pp. 59-89, 227, 228.

* cited by examiner

BYPASSING CACHE MEMORY IN A WRITE TRANSACTION IN A SYSTEM WITH MULTI-LEVEL MEMORY

FIELD

Embodiments of the present disclosure relate to integrated circuits (IC) that support multi-level memory hierarchy, and, in particular, to bypassing volatile memory in a write transaction in system with a multi-level memory.

BACKGROUND

Computer systems, such as server computers, workstations, personal computers, laptops, etc., typically operate with non-volatile memory (NVM) storage that does not lose data when power is removed, and volatile memory storage that loses data when power is removed. A multi-level memory (MLM) architecture, for example, a two-level memory (2LM) system, uses volatile memory to cache data for NVM. In order to make room for new data in volatile memory, existing data cached in volatile memory is evicted and copied to NVM for longer retention.

BRIEF DESCRIPTION OF THE DRAWINGS

Embodiments will be readily understood by the following detailed description in conjunction with the accompanying drawings. To facilitate this description, like reference numerals designate like structural elements. Further, the same reference numerals may be used in different drawings to identify the same or similar elements. Embodiments are illustrated by way of example and not by way of limitation in the figures of the accompanying drawings.

DETAILED DESCRIPTION

Figure 1:
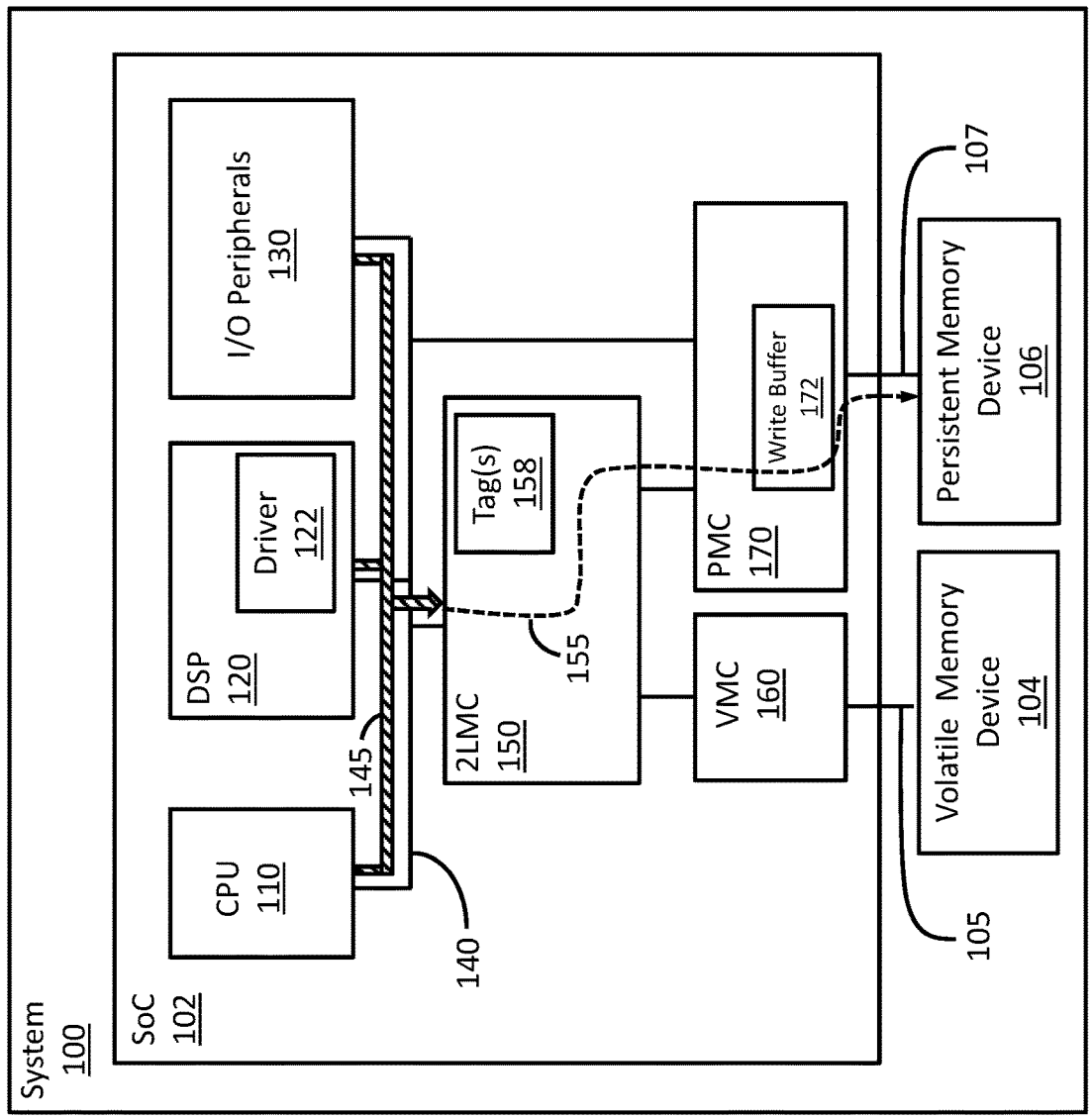
FIG. 1 illustrates a functional block diagram of an example system that includes a two-level memory controller (2LMC), in accordance with various embodiments.

Embodiments of the present disclosure relate to an apparatus, comprising a first memory controller, to receive a signal from a component coupled with the first memory controller, where the signal indicates that data is to bypass a volatile memory device coupled with the first memory controller and be written to a byte-addressable write-in-place persistent memory device coupled with the first memory controller. The first memory controller is further to determine, in response to the received signal, whether a write buffer in a second memory controller, coupled with the first memory controller, is empty; direct, if the write buffer is empty, the data to the write buffer for temporary storage prior to storage in the persistent memory device, to bypass the volatile memory device; and direct, if the write buffer is not empty, the data to the volatile memory device.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A or B" or "A and/or B" means (A), (B), (A) or (B), or (A and B). For the purposes of the present disclosure, the phrase "A, B, or C" or "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation. Further, various operations may be described as multiple discrete operations, in turn, in a manner that is most helpful in understanding the illustrative embodiments; however, the order of description should not be construed as to imply that these operations are necessarily order dependent. In particular, these operations are not required to be performed in the order of presentation.

The description may use the phrases "in various embodiments," "in some embodiments," "in an embodiment," "in embodiments," and the like, which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

The term "based on," and the like, along with its derivatives, may be used herein. "Based on" may mean that one element is based entirely on another element, or "based on" may mean that one element is based at least in part on another element and thus may be based at least in part on other elements.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

As used herein, including in the claims, the term "chip" may refer to a physical IC on a computer. A chip in the context of this document may thus refer to an execution unit that can be single-core or multi-core technology.

As used herein, including in the claims, the term "processor" may refer to a logical execution unit on a physical chip. A multi-core chip may have several cores. As used herein the term "core" may refer to a logical execution unit containing an L1 (lowest level) cache and functional units. Cores are understood as being able to independently execute programs or threads.

2LM is system memory expansion that comprises two levels of memory that include subsets of memory region dedicated from persistent media (in addition to, for example, run-time data). The main memory includes a first level (alternatively referred to herein as "near memory") that comprises smaller faster memory made of, for example, direct random-access memory (DRAM), and a second level (alternatively referred to herein as "far memory") that comprises larger and slower (with respect to the near memory) volatile memory (e.g., DRAM) or NVM storage (e.g., flash memory). 2LM may be managed by a combination of logic and modules executed via a host central processing unit (CPU). Near memory may be coupled to the host system CPU via high bandwidth, low latency means for efficient processing. Far memory may be coupled to the CPU via low bandwidth, high latency means (as compared to that of the near memory).

The far memory is presented as "extended main memory" to a host operating system (OS), while the near memory is a cache for the far memory that is transparent to the OS. Main memory is used to reduce latency and increase bandwidth for the system processor to store and retrieve memory operands from the persistent media. The processor executes the OS, as one or more applications request contents of the persistent media via the main memory.

Accordingly, a MLM system, such as, for example, but not limited to, a 2LM system, includes both volatile memory that loses data when power is removed, such as, for example, but not limited to, DRAM, and NVM that does not lose data when power is removed, such as, for example, but not limited to, hard drives or solid-state drives (SSD), such as, for example, but not limited to, three-dimensional crosspoint memory, which may also be referred to as a three-dimensional crosspoint memory device, 3DXP memory, or a 3DXP memory device. NVM, which may also be referred to as an NVM device, persistent memory, or a persistent memory device, is typically bigger in size than volatile memory, which may also be referred to as a volatile memory device. Given that volatile memory is used as cache for NVM, it may be referred to as cache memory or a cache memory device in this context. For example, data may be written to a near memory device for faster access relative to a NVM device, and then evicted to the larger and slower access NVM device.

Memory-bound write traffic, which may be referred to as write traffic, is transmitted through a memory system controller, such as, for example, but not limited to, a multi-level memory controller (MLMC), such as, for example, but not limited to, a 2LMC, which in turn accesses volatile memory to cache the write traffic. For example, after using data for operations, calculations, etc., an application or process writes data to be stored, and a 2LMC selects a cache line in volatile memory in which to cache the write traffic. If a selected cache line is storing existing data, that existing data may be sent to NVM for longer retention.

However, there are situations in which write traffic does not have good temporal or spatial locality, that is, the data is not accessed frequently, is intended to be stored in NVM, or is otherwise more advantageously stored in NVM without the need to be cached first in volatile memory. For example, an OS file system may reside in a 2LM hierarchy, and thus a driver for the OS file system may decide to write directly to the NVM, instead of writing first to volatile memory, because the driver has knowledge that the data will not be accessed soon. In another scenario, non-OS system agents, such as, for example, but not limited to, a digital system processor (DSP) or a graphics processor unit (GPU), may directly write to the file system in NVM without first writing to volatile memory.

Accessing volatile memory involves additional device input/output (I/O), which may, among other things, increase the use of system power, increase latencies in accessing data, and reduce the availability of volatile memory for utilization as cache. Accordingly, fewer accesses to volatile memory may reduce a system's overall power consumption, reduce latencies in accessing data, and free up volatile memory space.

Embodiments herein include aspects to communicate to, for example, but not limited to, a memory system controller, such as, for example, but not limited to, a MLMC, such as, for example, but not limited to, a 2LMC, an indication or a preference of the destination of data in a write transaction, that being an indication or a preference to write the data to a persistent memory device and bypass volatile memory, and thus operate to optimize the power and performance of, for example, but not limited to, volatile memory, NVM, or a system that includes MLM or 2LM.

Embodiments herein apply to cases where, for example, but not limited to, NVM is accessed with volatile memory as a cache, where write traffic typically does not go directly to NVM. An example of a case where data is first written to volatile memory that acts as a cache before the data is written to NVM, is where an Intel® 3D XPoint™ memory device is operating in its Memory Mode. In Memory Mode for the Intel® 3D XPoint™ memory device, DRAM is used as cache for the Intel® 3D XPoint™ memory device, which is used as addressable main memory. This extends the amount of available volatile memory visible to an OS. Although this example describes the Memory Mode of an Intel® 3D XPoint™ memory device, embodiments herein are not limited to cases involving an Intel® 3D XPoint™ memory device. Embodiments herein are applicable to any device, system, or situation in which data is typically first written to volatile memory that acts as a cache before the data is written to NVM.

Embodiments herein also include cache memory invalidation, if an earlier instance of write traffic exists in volatile memory and that earlier instance of write traffic is invalidated because a later instance of the write traffic is directed to persistent memory, thus bypassing volatile memory. Embodiments herein are applicable to, for example, but not limited to, any scenario in which an application or a process knows that the data is not going to be accessed for a relatively longer period of time and is able to tolerate the access latency of bypassing storage in volatile memory for storage in persistent memory.

Embodiments herein extend the concept of "clean to point of persistence," and drive a signal that indicates "Write To Point of Persistence," as an indicator to, for example, but not limited to, a memory system controller, such as, for example, but not limited to, a MLMC, such as, for example, but not limited to, a 2LMC. The 2LMC, for example, uses the signal to steer data that is to be written to memory, directly to persistent memory when appropriate, and bypass an additional write to volatile memory (and later another read from volatile memory and write to persistent memory upon eviction). Accordingly, embodiments herein may reduce memory power and system power by removing a write (cache allocation) to volatile memory, as well as later read (cache eviction) from volatile memory, and improve the utilization of the near memory as cache in, for example, a 2LM architecture.

For example, in write transactions that are intended for NVM, the number of transactions typically includes a total of two granules of volatile memory write, plus one granule of volatile memory read, plus two granules of NVM write. This may include, for example, one granule of volatile memory read of a cache line and one granule of NVM write, in order to evict existing data from a cache line and then write the existing data to NVM to make space for write traffic; one granule of volatile memory write for caching the write traffic and for cleaning/storing this data in the NVM; one granule of volatile memory read for evicting/retrieving the data from volatile memory; and one granule of NVM write for storing the write traffic in NVM. The foregoing is reduced to one granule of NVM write, to store write traffic and bypass volatile memory, along with not having to retrieve existing data from a cache line and write it to NVM to create space for the write traffic.

FIG. 1 illustrates an example system 100 that includes a 2LMC, in accordance with various embodiments. System 100 is, for example, but is not limited to, any system that includes a volatile memory device, a persistent memory device, or other storage or other storage devices. System 100 includes a processor, which is referred to herein as a system-on-chip (SoC) 102.

SoC 102 includes a central processing unit (CPU) 110, a DSP 120, and I/O Peripherals 130. CPU 110, DSP 120, or I/O Peripherals 130 generate read and write requests to 2LMC 150 over a bus 140, which is, for example, but is not limited to, an Advanced eXtensible Interface (AXI) bus, a memory bus, or a Peripheral Component Interconnect (PCI) bus, such as, for example, but not limited to, a Peripheral Component Interconnect express (PCIe) bus. I/O Peripherals 130 include, for example, but are not limited to, input devices (e.g., keyboard, touchscreen, mouse, etc.), display devices, graphics cards, ports, network interfaces, etc. Hardware device drivers, for example, such as, for example, but not limited to, storage device or bus drivers, may use volatile memory after transferring data through I/O operations.

SoC 102 further includes a 2LMC 150. Although various embodiments are described in terms of a memory system controller that is a 2LMC, embodiments herein are not limited to a memory system controller that is a 2LMC. SoC 102 may include any controller or any memory system controller that manages data in a volatile memory device, a persistent memory device, or other storage or other storage devices. In an embodiment, SoC 102 includes a MLMC, regardless of whether the MLMC is a 2LMC, and thus may be a MLMC that is a 2LMC or a MLMC that is other than a 2LMC. Other types of technologies or protocols may be used to implement a controller or memory system controller to maintain a first-level memory device, such as, for example, but not limited to, volatile memory device 104 (described below), as a cache for a larger second-level memory device, such as, for example, but not limited to, persistent memory device 106 (described below), and possible further level memories or other memory levels. Further, although various embodiments include a 2LMC, embodiments herein may include a host fabric interface (HFI); network interconnect card (NIC); or any other suitable device. In various embodiments, 2LMC 150 is placed on or in association with a memory tier that is caching one or more farther memory tiers. In some embodiments, a memory tier is exposed and/or managed by a MLMC, an HFI, or an NIC that includes 2LMC 150.

SoC 102 further includes a volatile-memory controller (VMC) 160 coupled with 2LMC 150, and a persistent-memory controller (PMC) 170 coupled with the 2LMC 150. PMC 170 includes write buffer 172, where write buffer 172 temporarily stores write traffic that is to be written to persistent memory device 106. System 100 further includes a volatile memory device 104 coupled with the VMC 160 via a volatile memory bus 105 (though embodiments herein are not limited to a volatile memory bus to couple volatile memory device 104 with VMC 160), and a persistent memory device 106 coupled with the PMC 170 via a persistent memory bus 107 (though embodiments herein are not limited to persistent memory bus to couple persistent memory device 106 with PMC 170). 2LMC 150 interfaces with volatile memory device 104 via VMC 160, and interfaces with persistent memory device 106 via PMC 170. Although various embodiments include a 2LMC 150 that interfaces with volatile memory device 104 via a VMC 160, and interfaces with persistent memory device 106 via a PMC 170, embodiments may include a 2LMC 150 that interfaces directly with volatile memory device 104 and persistent memory device 106, without a VMC 160 or a PMC 170. In various embodiments, 2LMC 150, which may be a MLMC as described above, is a first memory controller, and PMC 170 is a second memory controller.

Volatile memory device 104 is one or more volatile memory devices that require power to maintain the state of data stored by the one or more devices. Such a volatile memory device may be, for example, but is not limited to, various types of random access memory (RAM), such as DRAM, dual direct in-line memory modules (DIMMs), synchronous dynamic random access memory (SDRAM), etc. In various embodiments, DRAM complies with a standard promulgated by Joint Electron Device Engineering Council (JEDEC) (JEDEC), such as, for example, but not limited to, JESD79F for double data date (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards and similar standards may be referred to as DDR-based standards, and communication interfaces of the storage devices that implement such standards may be referred to as DDR-based interfaces.

In an embodiment, persistent memory device 106 is a three-dimensional crosspoint memory device. In some embodiments, the three-dimensional crosspoint memory device is, but is not limited to, a transistor-less stackable cross point architecture in which memory cells sit at the intersection of word lines and bit lines and are individually addressable and in which bit storage is based on a change in bulk resistance. Embodiments herein are not limited to persistent memory device 106 as a 3DXP memory device. Persistent memory device 106 may be any memory whose state is determinate even if power is interrupted to the device. In an embodiment, persistent memory device 106 may comprise a byte-addressable write-in-place three dimensional crosspoint memory device or other byte-addressable write-in-place NVM devices (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory-based device, a magnetic tunneling junction (MTJ) based device, a DW (Domain Wall) and SOT (Spin Orbit Transfer) based device, a thyristor based memory device, or a combination of any of the above, or other memory.

2LMC 150 receives a signal 145 from a component, such as, for example, but not limited to, DSP 120, coupled with 2LMC 150, where the signal 145 indicates that data 155 is to bypass volatile memory device 104 coupled with the 2LMC 150, and be written to byte-addressable write-in-place persistent memory device 106 coupled with 2LMC 150. Further, 2LMC 150 is to determine, in response to the received signal 145, whether write buffer 172 in PMC 170, coupled with the 2LMC 150, is empty; direct, if write buffer 172 is empty, the data 155 to write buffer 172 for temporary storage prior to storage in the persistent memory device 106, to bypass the volatile memory device 104; and direct, if write buffer 172 is not empty, the data to the volatile memory device 104. Although in various embodiments, 2LMC 150 determines whether the write buffer is empty in order to determine whether write traffic is able to bypass volatile memory device 104, embodiments herein are not limited to this manner of determining whether write traffic is able to bypass volatile memory device 104 and may use other factors to determine whether write traffic is able to bypass the volatile memory device 104. For example, 2LMC 150 may determine whether write buffer 172 is full, and if write buffer 172 is not full, then 2LMC 150 directs data 155 to persistent memory device 106.

For purposes of illustration and ease of explanation, embodiments herein refer to data. Data may be characterized as Write-To-Point-of-Persistence (WTP) data, while other data may be characterized as non-WTP data. WTP data is write traffic that is intended to bypass volatile memory device 104 and be written to persistent memory device 106. Alternatively, non-WTP data is write traffic that is intended to be written to volatile memory device 104. Write traffic is WTP data even if it is directed to volatile memory device 104. Further, write traffic is non-WTP data even if it is eventually written to persistent memory device 106, or not eventually written to persistent memory device 106, if, for example, it is stored in volatile memory device 104 in a cache line that is eventually marked as invalid (or if the data is eventually marked as clean while stored in a cache line). Although various embodiments include data 155 that is temporarily stored in write buffer 172 prior to being written to persistent memory device 106, embodiments may include data 155 that is stored in temporary storage other than a write buffer, or embodiments may include data 155 that is written to persistent memory device 106 without temporary storage in write buffer 172 or any other temporary storage.

Signal 145 is a physical signal transmitted via bus 140. In an embodiment, signal 145 is a WTP signal. In an embodiment, signal 145 is transmitted via a dedicated line on bus 140. In another embodiment, signal 145 is encoded via a non-dedicated line or lines on bus 140. In an embodiment, signal 145 is received when data 155 is received. For example, signal 145 and data 155 may be received in the same write transaction. In another embodiment, signal 145 is received separately from data 155. For example, signal 145 may be received in one write transaction, while data 155 is received in a separate write transaction. In an embodiment, the signal 145 is a modification of another signal, such as, for example, but not limited to, a bus protocol implementation-defined signal, such as, for example, but not limited to, an implementation-defined signal in an AXI bus protocol, a PCI bus protocol, such as, for example, but not limited to, a PCIe bus protocol, or any memory bus protocol. Embodiments herein are not limited to any particular bus protocol. In yet another embodiment, CPU 110, for example, propagates a signal when dirty data, i.e., data that is modified relative to an earlier instance of the data that is stored in volatile memory device 104 (or persistent memory device 106 if the data does not exist in volatile memory device 104), is cleaned by "data cache clean by virtual address to the point of persistence" (DC CVAP), and the DC CVAP operation causes signal 145 to be asserted. In yet another embodiment, signal 145 is a new signal, where a line or bit is added to a bus for the purpose of transmitting signal 145. In an embodiment, a value of 1 in a signal 145 indicates WTP data, while a value of 0 in a signal 145 indicates non-WTP data. In another embodiment, a signal 145 is a combination of one or more 0's or 1's that indicate whether data is WTP data or non-WTP data. In yet another embodiment, an operational value in a bus protocol, such as, for example, but not limited to, an AXI bus protocol, a PCI bus protocol, such as, for example, but not limited to, a PCIe bus protocol, or any memory bus protocol, or in an existing signal indicates WTP data, and additionally or alternatively, a different operational value in a bus protocol, such as, for example, but not limited to, an AXI bus protocol, a PCI bus protocol, such as, for example, but not limited to, a PCIe bus protocol, or any memory bus protocol, or in an existing signal indicates non-WTP data.

CPU 110, DSP 120, or I/O Peripherals 130 execute a write transaction to write data to volatile memory device 104 before the write traffic is evicted to persistent memory device 106, or CPU 110, DSP 120, or I/O Peripherals 130 execute a write transaction to write data to persistent memory device 106, to bypass volatile memory device 104. Upon transmitting write traffic, the CPU 110, DSP 120, or I/O Peripherals 130 are able to issue a signal 145 to 2LMC 150, to cause data 155 to bypass volatile memory device 104 and be sent directly to persistent memory device 106.

In an embodiment, 2LMC 150 receives the signal 145 from a component coupled with 2LMC 150. In an embodiment, a driver controls the generation of the signal 145 by the component. For example, DSP 120 includes a driver 122, which is, for example, but is not limited to, a software driver, that includes a program or executable instructions, to cause DSP 120 to issue the signal 145. For example, a driver may cause a component to generate signal 145 because the data 155 is type of data that is not accessed frequently, is intended to be stored in persistent memory device 106, or is otherwise more advantageously stored in persistent memory device 106 without the need to be cached first in volatile memory device 104. Although various embodiments include DSP 120 that includes a driver 122 to cause DSP 120 to issue the signal 145, embodiments herein are not limited to a driver in a DSP. Embodiments herein may include a driver in any component, such as, for example, but not limited to, a CPU, an I/O peripheral, or a GPU, whether included in SoC 102 or separate from SoC 102, to control the generation of the signal 145 by the component.

In an embodiment, 2LMC 150 includes one or more tags 158 that include information regarding cache lines that hold data in volatile memory device 104. A tag 158 is an entry for a cache line and includes information such as, for example, but not limited to, an address in persistent memory to which the data in a cache line is to be written, a valid bit, and a dirty bit.

The address for a tag entry is determined by an address or an index, which is a partial address, that is included with write traffic. When write traffic is stored in a cache line in volatile memory device 104, the address in persistent memory device 106, which is the address to which the cached data is to be written in persistent memory device 106, is used to identify the cache line that is storing the data. If cached data is an earlier instance of data 155, the address included with data 155 is used to determine whether a tag entry has the same address or otherwise corresponds to the address in the data 155. If the tag entry has the same address or otherwise corresponds to the address in the data 155, then 2LMC 150 knows that a cache line in volatile memory 104 is storing an earlier instance of the data 155, uses the tag 158 to mark the cache line as invalid, and is thus able to replace the existing data and use the cache line for read/write traffic that is to be stored in volatile memory device 104. A dirty bit, which may also be referred to as a dirty flag, indicates whether a cache line has modified data, i.e., existing data in the cache line that is different than corresponding data that may be already stored in persistent memory; and a valid bit, which may also be referred to as a valid flag, to indicate whether the cache line is valid, i.e., whether the cache line should be accessed when a cache line needs to be cleared to make space for new data to be written to volatile memory.

In various embodiments, the one or more tags 158 are included in a tag table that is included in 2LMC 150. Although various embodiments include one or more tags 158, or a tag table that includes the one or more tags 158, that are located in 2LMC 150, embodiments may include one or more tags, or a tag table that includes one or more tags, that are located in volatile memory device 104 or in persistent memory device 106.

In an embodiment, the one or more tags 158 indicate whether existing data is stored in volatile memory device 104. In an embodiment, the 2LMC 150 is to determine, if data 155 is directed to the persistent memory device 106, whether a tag 158 indicates that an earlier instance of the data is stored in volatile memory device 104; and the 2LMC 150 is to update, if the tag 158 indicates that the earlier instance of the data is stored in the volatile memory device 104, the tag 158 to indicate that the earlier instance of the data is invalid. In an embodiment, the earlier instance of the data in volatile memory device 104 has the same value as the data 155. In another embodiment, the earlier instance of the data in volatile memory device 104 has a different value than the data 155. In an embodiment, the 2LMC 150 compares an address in data 155 to addresses in tags 158, to determine whether an earlier instance of the data exists in volatile memory device 104. In an embodiment, the 2LMC 150 changes a valid flag of a tag 158 to invalid, to indicate that a cache line is not holding valid data, thereby indicating that the earlier instance of the WTP data in the cache line is invalid and can be replaced with other data that is to be written to volatile memory device 104. Although embodiments are described in terms of using a valid flag to indicate that a cache line is not holding valid data, other techniques may be used to indicate that a cache line is not holding valid data.

In an embodiment, the 2LMC 150 marks, if the data 155 is directed to the volatile memory device 104, a tag 158 to indicate that the data 155 is stored in volatile memory device 104. 2LMC 150 uses an address in persistent memory device 106 to which data is to be written, a valid flag, a dirty flag, or any combination thereof, in order to indicate whether data 155 is stored in a cache line in volatile memory device 104. However, embodiments herein are not limited to the use of an address, a valid flag, or a dirty flag for this purpose. Any other techniques may be used to indicate that a cache line is holding data 155.

In an embodiment, the 2LMC 150 is to receive a volatile memory write signal, where the volatile memory write signal indicates that data is to be written to volatile memory device 104; direct, in response to the volatile memory write signal, the data to the volatile memory device 104; and mark a tag 158 to indicate that the data is stored in the volatile memory device 104. In various embodiments, this is data that is intended to be written to volatile memory device 104, and thus it is data other than data that is intended to bypass volatile memory device 104 and be written to persistent memory device 106. In various embodiments, the tag 158 in the 2LMC 150 stores information such as an address in persistent memory device 106 to which data is to be written, a valid flag, a dirty flag, or any combination thereof, in order to indicate that the data is being stored in a cache line in volatile memory device 104. However, embodiments herein are not limited to the use of an address, a valid flag or a dirty flag for this purpose. Any other techniques may be used to indicate that a cache line is holding data.

As described above, in various embodiments, 2LMC 150 is included in a processor, such as, for example, SoC 102. However, embodiments herein are not limited to a 2LMC in a processor. For example, 2LMC 150, as well as, CPU 110, DSP 120, I/O Peripherals 130, VMC 160, and PMC 170, may be implemented on separate IC devices on a motherboard. Further, the functions of 2LMC 150, VMC 160, or PMC 170 may be implemented in one or more devices. Further, although various embodiments include 2LMC 150 performing the functions described herein, 2LMC 150 may include functional elements that perform the functions described herein.

In various embodiments, a boot ready-only memory (ROM) includes boot firmware to perform system initialization of components on SoC 102, such as, for example, but not limited to, Unified Extensible Firmware Interface (UEFI) or Basic Input Output System (BIOS) firmware. Such boot firmware initializes components on the SoC 102 during power-on or initialization sequences, to provide boot services for system initialization after control is handed over to an operating system for runtime operations. In various embodiments, such boot firmware, such as, for example, but not limited to, a BIOS driver, determines whether system 100, SoC 102, or components of system 100 or SoC 102 support the use of signal 145 or the operation of 2LMC 150 as described in various embodiments, and if so, configures the use of signal 145 or the operation of 2LMC 150 as described in various embodiments.

Various embodiments include the use of component firmware, such as, for example, but not limited to, firmware for CPU 110, DSP 120, I/O Peripherals 130, or a GPU. In various embodiments, such component firmware determines whether one or more components support the use of signal 145 or the operation of 2LMC 150 as described in various embodiments; if so, such component firmware configures and enables the use of a signal 145 by the component, so that the component is able to assert a signal 145 for certain write traffic when the component accesses a data buffer that includes write traffic, and 2LMC 150 receives write traffic that includes the signal 145 and operates accordingly as described in various embodiments.

Accordingly, various embodiments include the use of a signal to indicate that write traffic is to be written directly to persistent memory and thus bypass storage in volatile memory prior to being written to persistent memory. As a result, the number of accesses to volatile memory may be reduced, thereby reducing memory power consumption and system power consumption, reducing latencies in accessing data, and increasing the availability of space in volatile memory.

Figure 2:
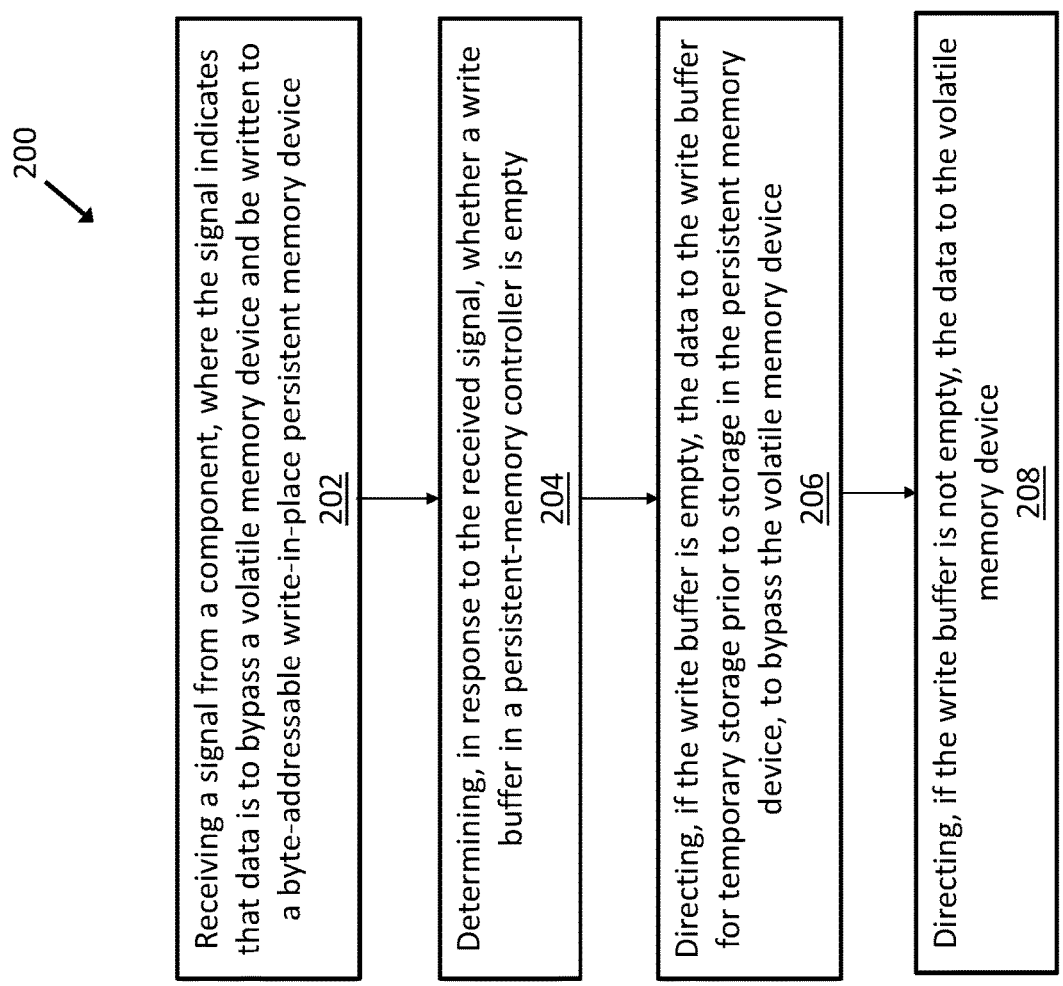
FIG. 2 illustrates an operational flow of a process for executing a write transaction to bypass volatile memory, in accordance with various embodiments.

FIG. 2 illustrates an operational flow of a process for executing a write transaction to bypass volatile memory, in accordance with various embodiments. In some embodiments, some or all of process 200 may be practiced by, for example, 2LMC 150 of FIG. 1 or by a MLMC. In some embodiments, the process may be performed by other components shown or described herein with respect to any other Figure. Process 200 includes blocks 202 through 208. In alternate embodiments, process 200 may have more or fewer operations, and some of the operations may be performed in different order.

At block 202, process 200 includes receiving a signal, such as, for example, signal 145, from a component, such as, for example, CPU 110, DSP 120, or I/O Peripherals 130, where the signal indicates that data, such as, for example, data 155, is to bypass a volatile memory device, such as, for example, volatile memory device 104, and be written to a persistent memory device, such as, for example, byte-addressable write-in-place persistent memory device 106. At block 204, process 200 includes determining, in response to the signal, whether a write buffer in a persistent-memory controller, such as, for example, write buffer 172 in PMC 170, is empty. At block 206, process 200 includes directing, if the write buffer is empty, the data to the write buffer for temporary storage prior to storage in the persistent memory device, to bypass the volatile memory device. At block 208, process 200 includes directing, if the write buffer is not empty, the data to the volatile memory device.

Figure 3:
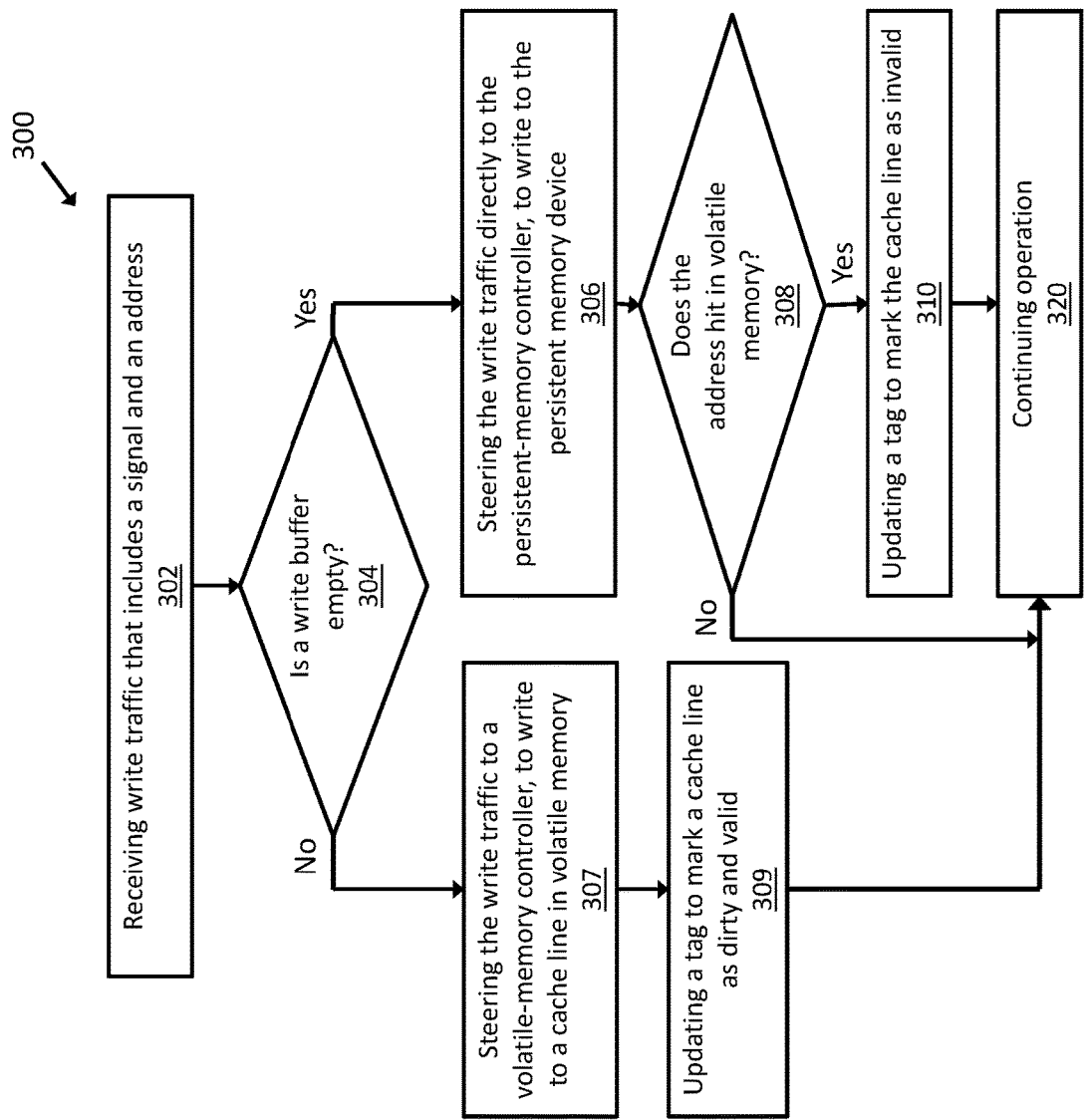
FIG. 3 illustrates another operational flow of a process for executing a write transaction to bypass volatile memory, in accordance with various embodiments.

FIG. 3 illustrates another operational flow of a process for executing a write transaction to bypass volatile memory, in accordance with various embodiments. In some embodiments, some or all of process 300 may be practiced by, for example, 2LMC 150 of FIG. 1 or by a MLMC. In some embodiments, the process may be performed by other components shown or described herein with respect to any other Figure. Process 300 includes blocks 302 through 320. In alternate embodiments, process 300 may have more or fewer operations, and some of the operations may be performed in different order.

At block 302, process 300 includes receiving write traffic, such as, for example, data 155, that includes a signal, such as, for example, signal 145, and an address for storage of the data in a persistent memory device, such as, for example, byte-addressable write-in-place persistent memory device 106. At block 304, process 300 includes determining whether a write buffer, such as, for example, write buffer 172, in a persistent-memory controller, such as, for example, PMC 170, is empty. At block 306, if the write buffer is empty, then at block 306, process 300 includes steering the write traffic directly to the PMC, to write to the persistent memory device. Further, at block 308, process 300 includes determining whether the address in the write traffic hits in a volatile memory device, such as, for example, volatile memory device 104. Determining whether the address hits in volatile memory includes, for example, but is not limited to, checking tags, such as, for example, one or more tags 158, to determine whether a tag corresponding to the address indicates that a cache line in the volatile memory device is valid. If there is a volatile memory hit for the address, at block 310, process 300 includes updating the tag to mark the cache line as invalid, and, at block 320 continuing operation. If there is not a volatile memory hit for the address, at block 320, process 300 includes continuing operation.

If, at block 304, the write buffer is not empty, then at block 307, process 300 includes steering the write traffic to a VMC, such as, for example, VMC 160, to write to a cache line in volatile memory. Further, at block 309, process 300 includes updating a tag to mark the cache line as dirty and valid, and, at block 320 continuing operation.

Figure 4:
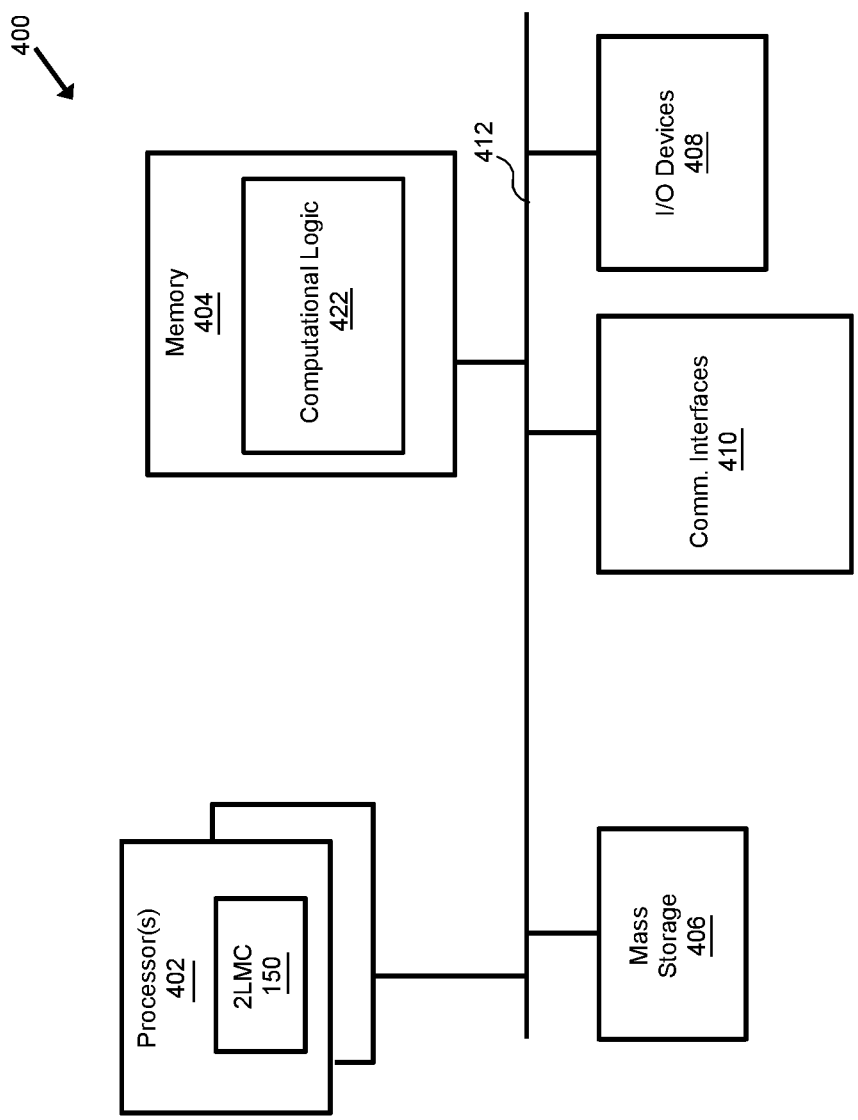
FIG. 4 illustrates an example computing device suitable to practice aspects of the present disclosure, in accordance with various embodiments.

FIG. 4 illustrates a block diagram of an example computing device 400 that may be suitable for use with 2LMC 150 of FIG. 1, the process 200 of FIG. 2, and/or the process 300 of FIG. 3, in accordance with various embodiments. Computing device 400 may also be referred to as a computing system.

As shown, computing device 400 may include one or more processors or processor cores 402 and system memory 404. For the purpose of this application, including the claims, the terms "processor" and "processor cores" may be considered synonymous, unless the context clearly requires otherwise. The processor 402 may include any type of processors, such as a central processing unit (CPU), a microprocessor, and the like. The processor 402 may be implemented as an integrated circuit having multi-cores, e.g., a multi-core microprocessor. In some embodiments, processors 402, in addition to cores, may further include hardware accelerators, e.g., hardware accelerators implemented with Field Programmable Gate Arrays (FPGA). The computing device 400 may include mass storage devices 406 (such as diskette, hard drive, non-volatile memory (NVM) (e.g., compact disc read-only memory (CD-ROM), digital versatile disk (DVD), any other type of suitable NVM, and so forth). In general, system memory 404 and/or mass storage devices 406 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory (DRAM). Non-volatile memory may include, but is not limited to, electrically erasable programmable read-only memory, phase change memory, resistive memory, and so forth.

The computing device 400 may further include I/O devices 408 (such as a display (e.g., a touchscreen display), keyboard, cursor control, remote control, gaming controller, image capture device, and so forth) and communication interfaces 410 (such as network interface cards, modems, infrared receivers, radio receivers (e.g., Bluetooth), and so forth), one or more antennas, and/or any other suitable component.

The communication interfaces 410 may include communication chips (not shown for clarity) that may be configured to operate the computing device 400 in accordance with a local area network (LAN) (e.g., Ethernet) and/or a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 410 may operate in accordance with other wireless protocols in other embodiments.

The above-described computing device 400 elements may be coupled to each other via system bus 412, which may represent one or more buses. In the case of multiple buses, they may be bridged by one or more bus bridges (not shown). Each of these elements may perform its conventional functions known in the art. In particular, system memory 404 and mass storage devices 406 may be employed to store a working copy and a permanent copy of the programming instructions for the operation of various components of computing device 400, including but not limited to an operating system of computing device 400, one or more applications, operations associated with computing device 400, operations associated with the processor 402, and/or operations associated with the mass storage device 406, collectively denoted as computational logic 422. The various elements may be implemented by assembler instructions supported by processor(s) 402 or high-level languages that may be compiled into such instructions. In some embodiments, processor 402 may be implemented as a fixed function ASIC, a FPGA, or any other suitable device with or without programmability or configuration options.

The permanent copy of the programming instructions may be placed into mass storage devices 406 in the factory, or in the field through, for example, a distribution medium (not shown), such as a compact disc (CD), or through communication interface 410 (from a distribution server (not shown)). That is, one or more distribution media having an implementation of the agent program may be employed to distribute the agent and to program various computing devices.

The number, capability, and/or capacity of the elements 408, 410, 412 may vary, depending on whether computing device 400 is used as a stationary computing device, such as a set-top box or desktop computer, or a mobile computing device, such as a tablet computing device, laptop computer, game console, or smartphone. Their constitutions are otherwise known, and accordingly will not be further described.

For some embodiments, at least one of processors 402 may be packaged together with computational logic 422 configured to practice aspects of embodiments described herein to form a System in Package (SiP) or a System on Chip (SoC).

In various implementations, the computing device 400 may comprise one or more components of a data center, a laptop, a netbook, a notebook, an ultrabook, a smartphone, a tablet, an ultra-mobile PC, or a mobile phone. In some embodiments, the computing device 400 may include one or more components of a server. In further implementations, the computing device 400 may be any other electronic device that processes data.

Figure 5:
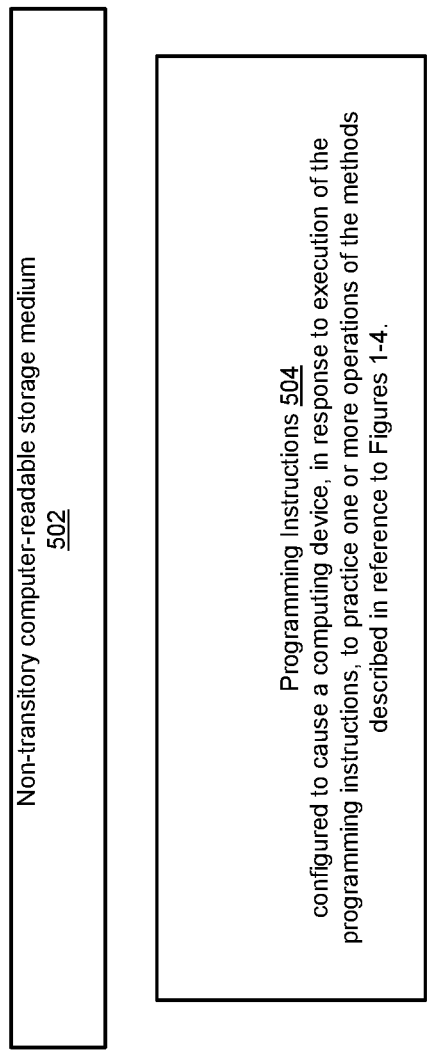
FIG. 5 illustrates an example storage medium with instructions configured to practice aspects of the present disclosure, in accordance with various embodiments.

FIG. 5 illustrates an example computer-readable non-transitory storage medium 402 having instructions configured to practice all or selected ones of the operations associated with system 100, earlier described with respect to FIG. 1; computing device 400, earlier described with respect to FIG. 4; 2LMC 150 described with respect to FIG. 1, the process 200 of FIG. 2, and/or the process 300 of FIG. 3, in accordance with various embodiments.

As illustrated, computer-readable storage medium 502 may include a number of programming instructions 504. The storage medium 502 may represent a broad range of non-transitory persistent storage medium known in the art, including but not limited to flash memory, dynamic random access memory, static random access memory, an optical disk, a magnetic disk, etc. Programming instructions 504 may be configured to enable a device, e.g., part or all of the system of FIG. 1, or part or all of the computing device 400 of FIG. 4, in response to execution of the programming instructions 504, to perform, e.g., but not limited to, various operations described for 2LMC 150, of FIG. 1, the process 200 of FIG. 2, and/or the process 300 of FIG. 3. In alternate embodiments, programming instructions 504 may be disposed on multiple computer-readable storage media 502. In an alternate embodiment, storage medium 502 may be transitory, e.g., signals encoded with programming instructions 504.

Referring back to FIG. 4, for an embodiment, at least one of processors 402 may be packaged together with memory having all or portions of computational logic 422 configured to practice aspects shown or described for part or all of 2LMC 150 of FIG. 1, the process 200 of FIG. 2, and/or the process 300 of FIG. 3. For an embodiment, at least one of processors 402 may be packaged together with memory having all or portions of computational logic 422 configured to practice aspects described for part or all of 2LMC 150 of FIG. 1, the process 200 of FIG. 2, and/or the process 300 of FIG. 3, to form a System in Package (SiP). For an embodiment, at least one of processors 402 may be integrated on the same die with memory having all or portions of computational logic 422 configured to practice aspects described for part or all of 2LMC 150 and/or the process 200 of FIG. 2, and/or the process 300 of FIG. 3. For an embodiment, at least one of processors 402 may be packaged together with memory having all or portions of computational logic 422 configured to practice aspects of part or all of 2LMC 150 of FIG. 1, the process 200 of FIG. 2, and/or the process 300 of FIG. 3 to form a System on Chip (SoC).

Machine-readable media (including non-transitory machine-readable media, such as machine-readable storage media), methods, systems and devices for performing the above-described techniques are illustrative examples of embodiments disclosed herein. Additionally, other devices in the above-described interactions may be configured to perform various disclosed techniques.

Various components described herein may be a means for performing the operations or functions described. Each component described herein may include software, hardware, or a combination of these. The components may be implemented as software modules, hardware modules, special-purpose hardware (e.g., application specific hardware, application specific integrated circuits (ASICs), digital signal processors (DSPs), etc.), embedded controllers, hardwired circuitry, and/or any other suitable hardware or software component. Besides what is described herein, various modifications may be made to the disclosed embodiments and implementations without departing from their scope.

Illustrative non-limiting examples of the technologies disclosed herein are provided below. An embodiment of the technologies may include any one or more, and any combination of, the examples described below.

EXAMPLES

According to various embodiments, the present disclosure describes a number of examples.

Example 1 is an apparatus, comprising: a first memory controller, to: receive a signal from a component coupled with the first memory controller, wherein the signal indicates that data is to bypass a volatile memory device coupled with the first memory controller and be written to a byte-addressable write-in-place persistent memory device coupled with the first memory controller; determine, in response to the received signal, whether a write buffer in a second memory controller, coupled with the first memory controller, is empty; direct, if the write buffer is empty, the data to the write buffer for temporary storage prior to storage in the persistent memory device, to bypass the volatile memory device; and direct, if the write buffer is not empty, the data to the volatile memory device.

Example 2 may include the apparatus of Example 1 or some other example herein, wherein the first memory controller is a multi-level memory controller, and wherein the second memory controller is a persistent-memory controller.

Example 3 may include the apparatus of Example 2, or some other example herein, wherein the multi-level memory controller is a two-level memory controller.

Example 4 includes the apparatus of Example 1 or some other example herein wherein the signal is a Write-To-Point-of-Persistence (WTP) signal.

Example 5 includes the apparatus of Example 1, 2, 3, 4 or some other example herein, wherein the signal is separate from the data.

Example 6 includes the apparatus of Example 1 or some other example herein, wherein the first memory controller includes one or more tags that indicate whether existing data is stored in the volatile memory device, and wherein the first memory controller is further to: determine, if the data is directed to the persistent memory device, whether a tag indicates that an earlier instance of the data is stored in the volatile memory device; and update, if the tag indicates that the earlier instance of the data is stored in the volatile memory device, the tag to indicate that the earlier instance of the data is invalid.

Example 7 includes the apparatus of Example 1, 2, 3, 4, 6, or some other example herein, wherein the first memory controller includes one or more tags that indicate whether existing data is stored in the cache memory device, and wherein the first memory controller is further to: direct the data to the cache memory device, if the write buffer is not empty; and mark, if the data is directed to the cache memory device, a tag to indicate that the data is stored in the cache memory device.

Example 8 includes the apparatus of Example 1, 2, 3, 4, 6, or some other example herein, wherein the first memory controller includes one or more tags that indicate whether existing data is stored in the volatile memory device, and wherein the first memory controller is further to: receive a volatile memory write signal, wherein the volatile memory write signal indicates that other data is to be written to the volatile memory device; direct, in response to the volatile memory write signal, the other data to the volatile memory device; and mark a tag to indicate that the other data is stored in the volatile memory device.

Example 9 includes the apparatus of Example 1, 2, 3, 4, 6, or some other example herein, wherein the first memory controller is included in a processor coupled with the persistent memory device and the volatile memory device.

Example 10 includes the apparatus of Example 1, 2, 3, 4, 6, or some other example herein, wherein the persistent memory device is a three-dimensional crosspoint memory device.

Example 11 is one or more non-transitory computer-readable media having instructions stored thereon that, when executed on a processor, cause a first memory controller on the processor to: receive a signal from a component coupled with the first memory controller, wherein the signal indicates that data is to bypass a volatile memory device coupled with the first memory controller and be written to a byte-addressable write-in-place persistent memory device coupled with the first memory controller; determine, in response to the received signal, whether a write buffer in a second memory controller, coupled with the first memory controller, is empty; direct, if the write buffer is empty, the data to the write buffer for temporary storage prior to storage in the persistent memory device, to bypass the volatile memory device; and direct, if the write buffer is not empty, the data to the volatile memory device.

Example 12 includes the one or more non-transitory, computer-readable media of Example 11 or some other example herein, wherein the first memory controller is a multi-level memory controller, and wherein the second memory controller is a persistent-memory controller.

Example 13 includes the one or more non-transitory, computer-readable media of Example 11, 12, or some other example herein, wherein the signal is separate from the data.

Example 14 includes the one or more non-transitory, computer-readable media of Example 11 or some other example herein, wherein the instructions, when executed on a processor, further cause the first memory controller on the processor to: determine, if the data is directed to the persistent memory device, whether a tag indicates that an earlier instance of the data is stored in the volatile memory device; and update, if the tag indicates that the earlier instance of the data is stored in the volatile memory device, the tag to indicate that the earlier instance of the data is invalid.

Example 15 includes the one or more non-transitory, computer-readable media of Example 11, 12, 14, or some other example herein, wherein the persistent memory device is a three-dimensional crosspoint memory device.

Example 16 is a computer system, comprising: a volatile memory device, coupled with the 2LMC; and a persistent memory device coupled with the 2LMC, wherein the 2LMC is to: receive a signal from a component coupled with the first memory controller, wherein the signal indicates that data is to bypass a volatile memory device coupled with the first memory controller and be written to a byte-addressable write-in-place persistent memory device coupled with the first memory controller; determine, in response to the received signal, whether a write buffer in a second memory controller, coupled with the first memory controller, is empty; direct, if the write buffer is empty, the data to the write buffer for temporary storage prior to storage in the persistent memory device, to bypass the volatile memory device; and direct, if the write buffer is not empty, the data to the volatile memory device.

Example 17 includes the computer system of Example 16 or some other example herein, wherein the signal is separate from the data.

Example 18 includes the computer system of Example 16 or some other example herein, wherein the 2LMC includes one or more tags that indicate whether existing data is stored in the volatile memory device, and wherein the 2LMC is further to: determine, if the data is directed to the persistent memory device, whether a tag indicates that an earlier instance of the data is stored in the volatile memory device; and update, if the tag indicates that the earlier instance of the data is stored in the volatile memory device, the tag to indicate that the earlier instance of the data is invalid Example 19 includes the computer system of Example 16, 17, 18, or some other example herein, further comprising a processor coupled with the persistent memory device and the volatile memory device, wherein the 2LMC is included in the processor.

Example 20 includes the computer system of Example 16, 17, 18, or some other example herein, wherein the persistent memory device is a three-dimensional crosspoint memory device.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions stored thereon that, when executed, result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

What is claimed is:

1. An apparatus, comprising:
a first memory controller, to operate a persistent memory device to store data, and a volatile memory device to store the data before the data is to be written to the persistent memory device, wherein the first memory controller is to:
maintain one or more tags that indicate whether existing data is stored in the volatile memory device;
receive a signal from a component coupled with the first memory controller, wherein the signal indicates that the data is to bypass the volatile memory device and be written to the persistent memory device, wherein the component comprises one of: a central processing unit, a digital system processor, or a peripheral device, wherein the signal is provided via a bus connecting the component with the first memory controller, wherein the signal is generated according to a bus protocol operating the bus;
determine, in response to the received signal, whether a write buffer included in a second memory controller is empty, wherein the second memory controller comprises a persistent memory controller that is coupled with the first memory controller to operate the persistent memory device, wherein the write buffer is to temporarily store the data that is to bypass the volatile memory device, before the data is to be written to the persistent memory device; direct, if the write buffer is empty, the data to the write buffer for temporary storage prior to storage in the persistent memory device, to bypass the volatile memory device;
direct, if the write buffer is not empty, the data to the volatile memory device;
determine, if the write buffer is empty, whether the data was present in the volatile memory device at a time of receipt of the signal; and
in response to a determination that the data was present in the volatile memory device at the time of receipt of the signal, update a tag of the one or more tags to indicate that the data that was present in the volatile memory device is invalid.

2. The apparatus of claim 1, wherein the first memory controller is a multi-level memory controller.

3. The apparatus of claim 2, wherein the multi-level memory controller is a two-level memory controller.

4. The apparatus of claim 1, wherein the signal is a Write-To-Point-of-Persistence (WTP) signal.

5. The apparatus of claim 1, wherein the signal is separate from the data.

6. The apparatus of claim 1, wherein the first memory controller is further to:
mark, if the data is directed to the volatile memory device, a tag of the one or more tags to indicate that the data is stored in the volatile memory device.

7. The apparatus of claim 1, wherein the first memory controller is further to:
receive a volatile memory write signal, wherein the volatile memory write signal indicates that other data is to be written to the volatile memory device;
direct, in response to the volatile memory write signal, the other data to the volatile memory device; and
mark a tag of the one or more tags to indicate that the other data is stored in the volatile memory device.

8. The apparatus of claim 1, wherein the first memory controller is included in a processor coupled with the persistent memory device and the volatile memory device.

9. The apparatus of claim 1, wherein the persistent memory device is a three-dimensional crosspoint memory device.

10. One or more non-transitory computer-readable media having instructions stored thereon that, when executed on a processor, cause a first memory controller, coupled with the processor to operate a persistent memory device to store data, and a volatile memory device to store the data before it is to be written to the persistent memory device, to:
maintain one or more tags that indicate whether existing data is stored in the volatile memory device;
receive a signal from a component coupled with the first memory controller, wherein the signal indicates that the data is to bypass the volatile memory device and be written to the persistent memory device, wherein the component comprises one of: a central processing unit, a digital system processor, or a peripheral device, wherein the signal is provided via a bus connecting the component with the first memory controller, wherein the signal is generated according to a bus protocol operating the bus;
determine, in response to the received signal, whether a write buffer included in a second memory controller is empty, wherein the second memory controller comprises a persistent memory controller that is coupled with the first memory controller to operate the persistent memory device, wherein the write buffer is to temporarily store the data that is to bypass the volatile memory device, before the data is to be written to the persistent memory device;
direct, if the write buffer is empty, the data to the write buffer for temporary storage prior to storage in the persistent memory device, to bypass the volatile memory device;
direct, if the write buffer is not empty, the data to the volatile memory device;
determine, if the write buffer is empty, whether the data was present in the volatile memory device at a time of receipt of the signal; and
in response to a determination that the data was present in the volatile memory device at the time of receipt of the signal, update a tag of the one or more tags to indicate that the data that was present in the volatile memory device is invalid.

11. The one or more non-transitory, computer-readable media of claim 10, wherein the first memory controller is a multi-level memory controller.

12. The one or more non-transitory, computer-readable media of claim 10, wherein the signal is separate from the data.

13. The one or more non-transitory, computer-readable media of claim 10, wherein the persistent memory device is a three-dimensional crosspoint memory device.

14. A computer system, comprising:
a first memory controller comprising a two-level memory controller (2LMC);
a persistent memory device coupled with the first memory controller to store data; and a volatile memory device, coupled with the first memory controller, to store the data before the data is to be written to the persistent memory device;
wherein the first memory controller is to:
    maintain one or more tags that indicate whether existing data is stored in the volatile memory device;
    receive a signal from a component coupled with the 2LMC, wherein the signal indicates that the data is to bypass the volatile memory device and be written to the persistent memory device, wherein the component comprises one of: a central processing unit, a digital system processor, or a peripheral device, wherein the signal is provided via a bus connecting the component with the first memory controller, wherein the signal is generated according to a bus protocol operating the bus;
    determine, in response to the received signal, whether a write buffer included in a second memory controller is empty, wherein the second memory controller comprises a persistent memory controller that is coupled with the first memory controller to operate the persistent memory device, wherein the write buffer is to temporarily store the data that is to bypass the volatile memory device, before the data is to be written to the persistent memory device;
    direct, if the write buffer is empty, the data to the write buffer for temporary storage prior to storage in the persistent memory device, to bypass the volatile memory device;
    direct, if the write buffer is not empty, the data to the volatile memory device,
    determine, if the write buffer is empty, whether the data was present in the volatile memory device at a time of receipt of the signal; and
    in response to a determination that the data was present in the volatile memory device at the time of receipt of the signal, update a tag of the one or more tags to indicate that the data that was present in the volatile memory device is invalid.

15. The computer system of claim 14, wherein the signal is separate from the data.

16. The computer system of claim 14, further comprising a processor coupled with the persistent memory device and the volatile memory device, wherein the first memory controller is included in the processor.

17. The computer system of claim 14, wherein the persistent memory device is a three-dimensional crosspoint memory device.

* * * * *